V. A. BOKER.
RADIATOR FAN SUPPORTING MEANS.
APPLICATION FILED MAR. 20, 1918.
1,352,869. Patented Sept. 14, 1920.
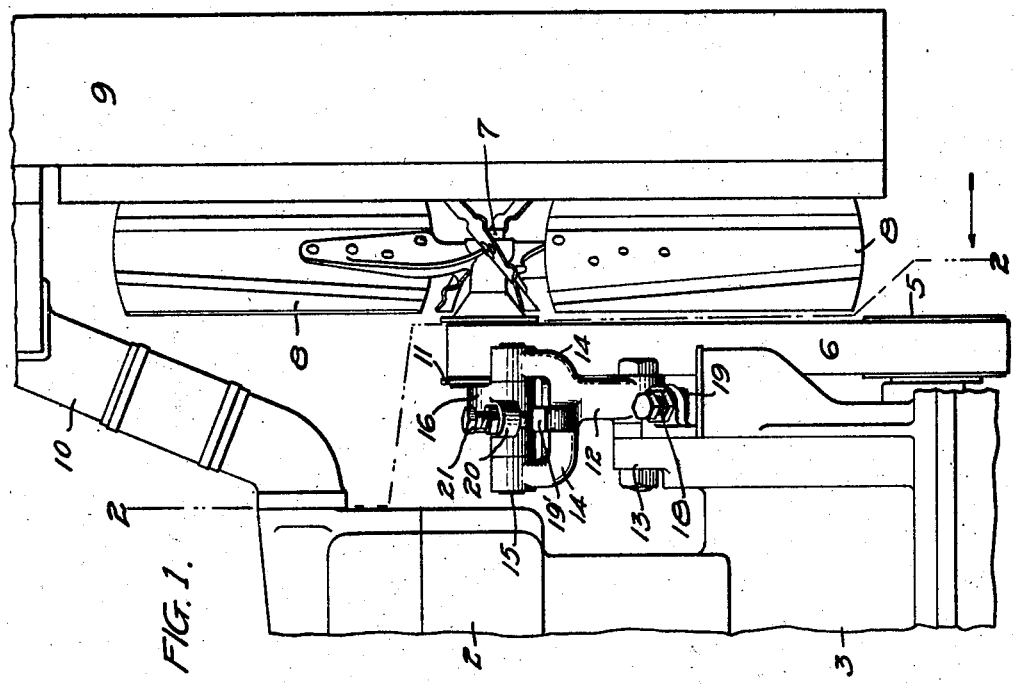
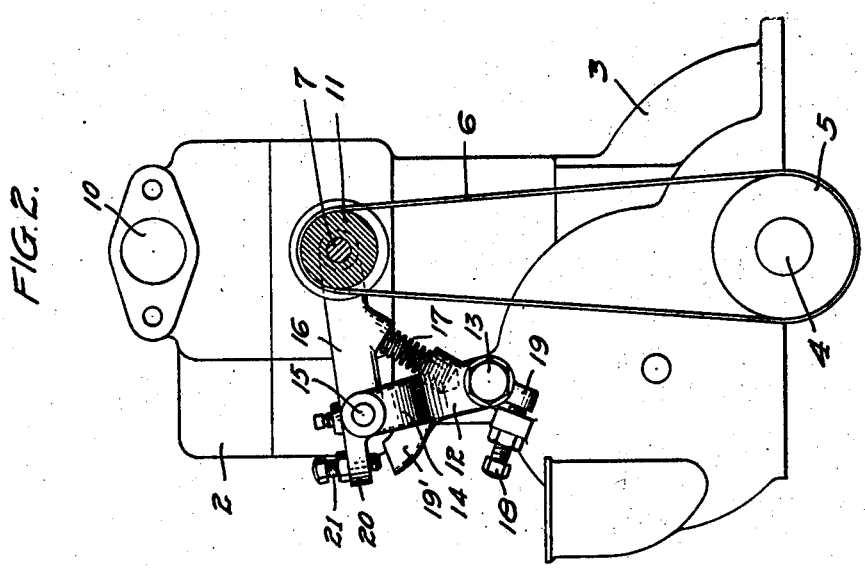
WITNESSES
INVENTOR
VITUS A. BOKER
BY
ATTORNEYS

UNITED STATES PATENT OFFICE.

VITUS A. BOKER, OF MINNEAPOLIS, MINNESOTA, ASSIGNOR TO THE E. G. STAUDE MANUFACTURING CO., OF ST. PAUL, MINNESOTA, A CORPORATION.

RADIATOR-FAN-SUPPORTING MEANS.

1,352,869.

Specification of Letters Patent.

Patented Sept. 14, 1920.

Application filed March 20, 1918. Serial No. 223,533.

*To all whom it may concern:*

Be it known that I, VITUS A. BOKER, a citizen of the United States, resident of Minneapolis, county of Hennepin, State of Minnesota, have invented certain new and useful Improvements in Radiator-Fan-Supporting Means, of which the following is a specification.

The object of my invention is to provide improved means for supporting the fan of a gas engine radiator and maintaining a suitable tension on the fan belt.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation of a portion of a gas engine and radiator, showing the position of the fan and the means for supporting the fan shaft, Fig. 2 is a sectional view on the line 2—2 of Fig. 1.

In the drawing, 2 represents a gas engine having a crank case 3 and shaft 4 provided with a pulley 5 for the fan driving belt 6. 7 is the shaft of a fan 8 arranged in the rear of and adjacent to the radiator 9 that is connected with the circulating system of the engine through the pipe 10. A pulley 11 is mounted on the shaft 7 over which the belt 6 passes. A fork 12 is journaled at 13 on the engine frame and has arms 14 in which bearings are formed for a shaft 15. An arm 16 is journaled on the shaft 15 and has a bearing at one end for the shaft 7 of the fan. A compression spring 17 interposed between the arm 16 and the fork 12 normally holds the said arm in its raised position and maintains a suitable tension on the belt 6. The vertical adjustment of the arm 16 may be effected by means of a set screw 18 which is mounted on the frame of the engine in position to engage a lug 19 on the hub of the fork 12. By adjusting this set screw 18 the fork may be rocked back and forth on its bearing until the arm 16 is raised to the proper level for the efficient operation of the fan. The weight of the fan and the arm will normally tend to compress the spring 17 so that the belt will be held with a yielding tension, which may be increased or decreased at any time by the adjustment of the screw 18. The spring 17 being under a considerable degree of compression, it is desirable to provide some means for checking the arm 16 in case the spring should be suddenly released by the breaking of the belt 6. I therefore provide a stop 19' in the path of a lug 20 on the arm 16 and mount a set screw 21 in said arm in position to engage the stop 19' and limit the upward movement of the arm 16 in case the fan belt should run off or break.

With this device the desired tension may be maintained on the fan belt at all times and the weight of the fan will be yieldingly supported.

I claim as my invention:

1. The combination, with a gas engine frame, of an arm pivotally supported thereon, a fan shaft having a bearing in its arm, a driving belt for said fan shaft, and a spring mounted on one side of the pivot of said arm to yieldingly support said arm and tension said belt and a stop device for said arm mounted on the other side of its pivot.

2. The combination, with a gas engine frame, of an arm pivotally supported thereon, a fan having a bearing on said arm, a pulley and driving belt for said fan, a spring mounted to yieldingly hold said arm in position to tension said belt, and means for checking the movement of said arm in case of sudden release of said spring through the breaking of said belt.

3. The combination, with a gas engine frame, of a fork pivoted thereon, an arm journaled on said fork, a spring interposed between said arm and fork for normally resisting downward movement of said arm with respect to said fork, a fan shaft and fan carried by said arm and having a driving pulley and a belt for said pulley, said spring normally resisting the pull of the belt on said pulley and the weight of the fan on said arm.

4. The combination, with a frame, of a fork pivoted thereon, an arm journaled in said fork, a spring interposed between said arm and fork, a fan having its shaft journaled in said arm, and a driving belt for said fan, an adjustable screw mounted in said arm on the other side of its pivot from said spring, and a stop on said fork in the path of said screw.

5. In combination with a fan, a bracket member, an arm fulcrumed on the bracket member, a fan shaft carried by the free end of the fulcrumed arm and provided with a belt pulley, a spring for sustaining the end of the arm carrying the fan shaft, and means for limiting the upward movement of the arm carrying the fan shaft.

6. An adjustable bracket member, an arm fulcrumed on the bracket member, a fan shaft carried by the free end of the fulcrumed arm and provided with a belt pulley, a spring for sustaining the end of the arm carrying the fan shaft, means for adjusting the bracket member to elevate the free end of the fulcrumed arm, and means for limiting the upward movement of the fulcrumed arm.

7. The combination, with a gas engine frame, of an arm pivotally supported thereon and a fan having a bearing on said arm, a pulley and driving belt for said fan, a spring mounted to yieldingly hold said arm in position to tension said belt, and an adjustable stop device mounted in said arm on the other side of its pivot from said spring for checking the movement of said arm in case of sudden release of the spring through the breaking of said belt.

8. The combination, with a frame, of a fork pivoted thereon, an arm journaled in said fork, a spring interposed between said arm and fork, a fan having its shaft journaled in said arm, and a driving belt for said fan, and means for adjusting said fork to raise said arm.

In witness whereof I have hereunto set my hand this 8th day of March, 1918.

VITUS A. BOKER.

Witnesses:
FREDERICK HANSEN,
P. SULLIVAN.